US010665902B2

(12) United States Patent
Tutunaru

(10) Patent No.: US 10,665,902 B2
(45) Date of Patent: May 26, 2020

(54) MAGNESIUM AND BETA ALUMINA CURRENT COLLECTOR

(71) Applicant: Catalin Tutunaru, Cape Elizabeth, ME (US)

(72) Inventor: Catalin Tutunaru, Cape Elizabeth, ME (US)

(*) Notice: Subject to any disclaimer, the term of this patent is extended or adjusted under 35 U.S.C. 154(b) by 268 days.

(21) Appl. No.: 15/319,437

(22) PCT Filed: Jun. 19, 2015

(86) PCT No.: PCT/US2015/036594
§ 371 (c)(1),
(2) Date: Dec. 16, 2016

(87) PCT Pub. No.: WO2015/200108
PCT Pub. Date: Dec. 30, 2015

(65) Prior Publication Data
US 2017/0133721 A1    May 11, 2017

Related U.S. Application Data

(60) Provisional application No. 62/015,454, filed on Jun. 22, 2014.

(51) Int. Cl.
| | | |
|---|---|---|
| H01M 10/39 | (2006.01) | |
| H01M 2/16 | (2006.01) | |
| H01M 4/66 | (2006.01) | |
| H01M 4/75 | (2006.01) | |

(52) U.S. Cl.
CPC ....... *H01M 10/399* (2013.01); *H01M 2/1646* (2013.01); *H01M 4/661* (2013.01); *H01M 4/664* (2013.01); *H01M 4/667* (2013.01); *H01M 4/75* (2013.01); *H01M 2300/0057* (2013.01)

(58) Field of Classification Search
None
See application file for complete search history.

(56) References Cited

U.S. PATENT DOCUMENTS

| | | | | |
|---|---|---|---|---|
| 4,143,929 A | * | 3/1979 | Boje | H01R 39/64 439/26 |
| 5,449,575 A | * | 9/1995 | Moulton | H01M 2/30 429/162 |
| 6,235,422 B1 | * | 5/2001 | Kaplan | H01M 2/22 429/161 |

(Continued)

FOREIGN PATENT DOCUMENTS

KR    1020130075438    *   7/2013    ......... H01M 10/39

*Primary Examiner* — Jonathan Crepeau
*Assistant Examiner* — Angela J Martin
(74) *Attorney, Agent, or Firm* — Law Offices of Daniel A. Tesler, LLC

(57) ABSTRACT

A battery cell with a magnesium and beta alumina current collector includes a magnesium core with a beta alumina covering and bare magnesium collectors. The preferred embodiment uses a two chamber battery cell with a ceramic separator, where the cathode chamber contains the current collector and a compound of 38% common salt (NaCl) containing 80 micrograms of Iodine (I) per gram of common salt (NaCl), 18% Iron (Fe), 15% Zinc, (Zn), 16% Copper (Cu), 5% Nickel (Ni) and 4% Silver (Ag), and the anode chamber contains a compound of 38% common salt (NaCl) containing 80 micrograms of Iodine (I) per gram of common salt (NaCl).

19 Claims, 1 Drawing Sheet

(56) References Cited

U.S. PATENT DOCUMENTS

| | | | | |
|---|---|---|---|---|
| 8,129,052 B2* | 3/2012 | Visco | ................ | H01M 4/02 |
| | | | | 429/231.9 |
| 8,586,227 B2* | 11/2013 | Farmer | ............... | H01M 2/1646 |
| | | | | 29/623.1 |
| 2016/0193935 A1* | 7/2016 | Tutunaru | .............. | H01M 10/36 |
| | | | | 320/112 |

* cited by examiner

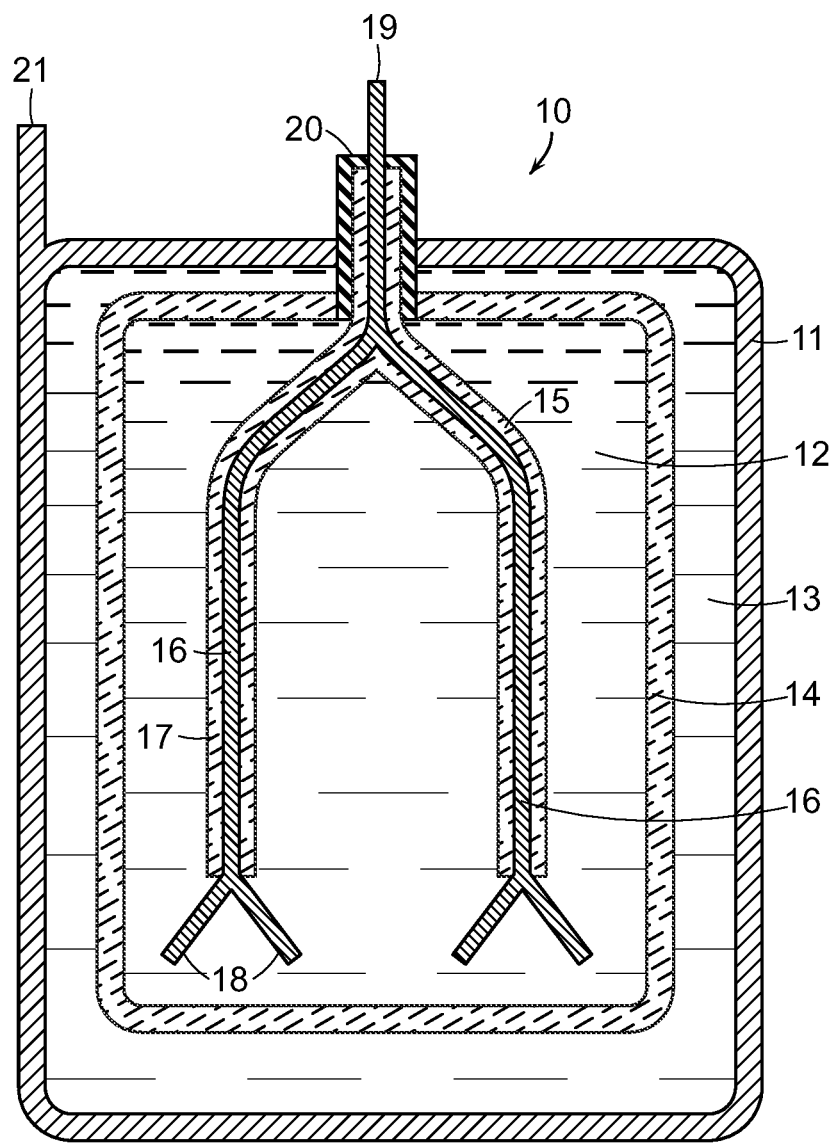

MAGNESIUM AND BETA ALUMINA CURRENT COLLECTOR

CROSS REFERENCE TO RELATED APPLICATIONS

This application claims the benefit of U.S. Provisional Patent Application No. 62/015,454 filed Jun. 22, 2014, which is hereby incorporated by reference in its entirety.

FIELD OF THE INVENTION

The present invention relates to electrical storage devices and, in particular, to battery cells.

BACKGROUND OF THE INVENTION

A type of battery cell in use today is the Sodium-Nickel Chloride battery. This type of cell uses an anode reservoir, a cathode reservoir and a beta alumina separator. The anode reservoir is typically filled with Sodium (Na) and the cathode reservoir is typically filled with Nickel (Ni) or Nickel Chloride (NiCl2) and an electrolyte. The beta alumina separator only allows sodium ions to pass, therefore the cathode reservoir contains Nickel (Ni) when discharged and Nickel Chloride when charged (NiCl2). A cell case generally surrounds the anode reservoir and acts as the negative electrode. A positive electrode extends into the cathode reservoir and is typically rod shaped.

In Sodium-Nickel Chloride cells, charging the cells more quickly typically reduces the battery's lifespan (when measured in cycles). In addition, increases in power and energy density are needed over the prior art to reduce the size and weight of Sodium-Nickel Chloride cells to make the battery cell useful in more applications.

Accordingly, it is an object of the present invention to provide a battery cell with an increased power density, an increased energy density, a reduced size and weight and a reduced charging time without an impact on battery life.

BRIEF SUMMARY OF THE INVENTION

The present invention provides a battery cell with an anode chamber and a cathode chamber with a ceramic separator between the two chambers. Inside the cathode chamber is a current collector comprising two magnesium prongs with a ceramic exterior and a multitude of bare magnesium collectors extending from each prong. The anode chamber is filled with chemically pure common salt (NaCl) with 80 micrograms of Iodine (I) added for every gram of NaCl. The cathode chamber is filled with a compound comprising common salt (NaCl), Zinc (Zn), Copper (Cu), Iron (Fe), Silver (Ag), Nickel (Ni) and various additives in small quantities.

For clarity, a representative structure of a single battery cell is shown in the drawing. While only a single cell is shown in the drawing, those skilled in the art will readily appreciate how the cell described would be integrated into a particular multi-cell battery or multi-cell electrical storage device. The invention may be used in an electric or hybrid vehicle, but also can also be used in any application that requires electrical energy to be stored.

BRIEF DESCRIPTION OF THE SEVERAL VIEWS OF THE DRAWINGS

FIG. 1 is a sectioned side view of a single battery cell.

DETAILED DESCRIPTION OF THE INVENTION

In FIG. 1 is a side sectioned view of the invention presented as a single cell 10. Each cell 10 comprises a case 11, containing a first chamber 12 inside a second chamber 13, with the first and second chambers separated by a ceramic separator 14. Inside the first chamber 12 is a current collector 15 comprising multiple magnesium prongs 16 encased in a ceramic 17, each with multiple bare magnesium collectors 18 extending from its terminus in the first chamber 12. In the preferred embodiment, the ceramic 17 is beta alumina, but it is to be understood that various materials would also be suitable. The multiple magnesium prongs 16 increase the surface area of the current collector over a single strand current collector. The multiple bare magnesium collectors 18 and the ceramic casing 17 also serve to increase the surface area of the current collector.

By increasing the surface are of the current collector, the cell is able to complete its chemical reactions more quickly, increasing its efficiency. This increase in efficiency results in an increased energy and power density, allowing for a smaller and lighter battery to be used. The increased efficiency also reduces the charging time of the cell without impacting the cell's lifetime cycles.

The first chamber 12 is the cathode chamber and is filled with a compound comprising common salt (NaCl), Zinc (Zn), Copper (Cu), Iron (Fe), Silver (Ag), Nickel (Ni), Iodine (I) and various additives in small quantities. In the preferred embodiment, the first chamber contains a compound of approximately 38% chemically pure common salt (NaCl) with 80 micrograms of Iodine (I) added for every gram of NaCl, 18% Iron (Fe), 15% Zinc, (Zn), 16% Copper (Cu), 5% Nickel (Ni), 4% Silver (Ag) and 4% miscellaneous additives. The miscellaneous additives are comprised of Sodium Aluminum Tetrachloride (NaAlCl4), Mica, Silica Amorphous (SiO2), and Sulfide (S2-). The second chamber 13 is the anode chamber and is filled with chemically pure common salt (NaCl) with 80 micrograms of Iodine (I) added for every gram of NaCl.

The common salt (NaCl) used in the cell must be uniform in size to allow an even chemical reaction in the cell. Smaller crystals increase the surface area and therefore increase the chemical reactions and the temperature of the cell. Larger crystals decrease the surface area and therefore decrease the chemical reactions and temperature of the cell. Using mixed sizes of crystals can cause uneven temperatures in the cell, reducing performance. In the preferred embodiment, jagged NaCl crystals of approximately 1.5×1.5×2.0 mm were found to strike the best balance in crystal size. The jagged NaCl crystals also were found to pack into the cell more densely than square crystals, increasing the density of the compound and the energy potential of the cell.

The ceramic separator 14 can be constructed of a variety of compounds, depending on the chemical composition of the anode and cathode chambers. The ceramic separator 14 must be nonporous, able to withstand the operating temperatures of the cell and capable of allowing sodium ions to pass between the anode chamber 13 and the cathode chamber 12. In the preferred embodiment, the cell achieves its optimum performance between 270° C. and 300° C. and the ceramic separator 14 is beta alumina.

The positive electrode 19 extends out of the case 11 and is a magnesium wire connected to the magnesium prongs 16. The insulating layer 20 electrically insulates the positive electrode 19 from the ceramic separator 14, the second chamber 13 and the case 11. The insulating layer 20 can be constructed of a variety of non-conducting materials that are able to withstand the operating temperature of the cell. The negative electrode 21 is a wire extending from the case 11. In the preferred embodiment, the case 11 is comprised of Iron (Fe) and can optionally have an additional layer to electrically insulate the exterior of the case.

When the battery is charged, the compound in the first chamber 12 is converted into Magnesium Chloride (MgCl2) and the compound in the second chamber 13 is converted into liquid salt (NaCl). When the battery is discharged, the chemical reaction occurs in reverse and the Sodium (Na) reacts with the Magnesium Chloride (MgCl2) in the positive electrode. When fully discharged, the positive electrode is Magnesium (Mg). The electrolyte (Sodium Chloroaluminate) conducts sodium ions and allow the sodium ions to move from the solid metal chloride electrode to and from the ceramic electrolyte.

What has been described is a battery cell for the storage of electrical energy. In this disclosure, there are shown and described only the preferred embodiment of the invention, but, as aforementioned, it is to be understood that the invention is capable of use in various other combinations and environments and is capable of changes or modifications within the scope of the inventive concept as expressed herein.

The invention claimed is:

1. A battery cell comprising:
a cathode reservoir partially containing a current collector; and
an anode reservoir surrounding the cathode reservoir;
wherein the current collector comprises:
a metal wire having a first end and a second end, where said first end is a single wire and said second end comprises a plurality of splits into a plurality of wire ends;
wherein each of said plurality of splits is located within the single cathode reservoir;
a ceramic ion conducting material covering enclosing said metal wire between said first end and said second end; and
a multitude of metal prongs extending from said second end electrically connected to said metal wire.

2. The battery current collector of claim 1 where said metal wire comprises magnesium.

3. The battery current collector of claim 1 where said ceramic covering comprises beta alumina.

4. The battery current collector of claim 1 where said metal wire comprises magnesium and said ceramic covering comprises beta alumina.

5. The battery current collector of claim 4 where said first end of said metal wire is covered by an electrically insulating material.

6. A battery cell comprising:
a first container having an inner surface and an outer surface;
a second container surrounding said first container, having an inner surface and an outer surface;
a first chamber defined by the inner surface of said first container;
a second chamber defined by the outer surface of said first container and the inner surface of said second container;
a current collector inside said first chamber and extending through the wall of said first container and said second container comprising:
a metal wire having a first end and a second end, where said first end is a single wire and said second end is split into two or more wires;
a ceramic ion conducting material covering enclosing said metal wire in an area within the first container; and
a multitude of metal prongs extending from said second end and electrically connected to said metal wire.

7. The battery cell of claim 6 where said metal wire comprises magnesium.

8. The battery cell of claim 6 where said ceramic covering comprises beta alumina.

9. The battery cell of claim 6 where said metal wire comprises magnesium and said ceramic covering comprises beta alumina.

10. The battery cell of claim 9 where said first end of said metal wire is covered by an electrically insulating material.

11. The battery cell of claim 10 where said first container comprises beta alumina.

12. The battery cell of claim 11 where said second container comprises a metal.

13. The battery cell of claim 12 where said first chamber contains a first compound comprising approximately 38% common salt (NaCl) containing 80 micrograms of Iodine (I) per gram of common salt (NaCl), 18% Iron (Fe), 15% Zinc, (Zn), 16% Copper (Cu), 5% Nickel (Ni) and 4% Silver (Ag).

14. The battery cell of claim 13 where said second chamber contains a second compound comprising common salt (NaCl) containing 80 micrograms of Iodine (I) per gram of common salt (NaCl).

15. The battery cell of claim 14 where said first compound further comprises Sodium Aluminum Tetrachloride (NaAlCl4).

16. The battery cell of claim 14 where said first compound further comprises Mica.

17. The battery cell of claim 14 where said first compound further comprises Silica Amorphous (SiO2).

18. The battery cell of claim 14 where said first compound further comprises Sulfide (S2−).

19. The battery cell of claim 14 where said first compound further comprises 4% miscellaneous additives comprising Sodium Aluminum Tetrachloride (NaAlCl4), Mica, Silica Amorphous (SiO2) and Sulfide (S2−).

* * * * *